(12) United States Patent
Asaro et al.

(10) Patent No.: US 8,219,736 B2
(45) Date of Patent: Jul. 10, 2012

(54) METHOD AND APPARATUS FOR A DATA BRIDGE IN A COMPUTER SYSTEM

(75) Inventors: Antonio Asaro, Scarborough (CA); Brian Lee, Etobicoke (CA); Kuldip Sahdra, Richmond Hill (CA); Gordon Caruk, Bramalea (CA)

(73) Assignee: ATI Technologies ULC, Markham, Ontario (CA)

( * ) Notice: Subject to any disclaimer, the term of this patent is extended or adjusted under 35 U.S.C. 154(b) by 2042 days.

(21) Appl. No.: 10/074,064

(22) Filed: Feb. 12, 2002

(65) Prior Publication Data
US 2003/0154341 A1 Aug. 14, 2003

(51) Int. Cl.
*G06F 13/36* (2006.01)
(52) U.S. Cl. ........................................ 710/306
(58) Field of Classification Search .............. 710/9–11, 710/104, 306; 713/1–100
See application file for complete search history.

(56) References Cited

U.S. PATENT DOCUMENTS

| | | | | |
|---|---|---|---|---|
| 4,580,246 A | * | 4/1986 | Sibigtroth | 365/195 |
| 5,568,619 A | * | 10/1996 | Blackledge et al. | 710/313 |
| 5,764,995 A | * | 6/1998 | DeRoo et al. | 710/200 |
| 5,778,197 A | * | 7/1998 | Dunham | 710/104 |
| 5,857,083 A | * | 1/1999 | Venkat | 710/314 |
| 5,857,086 A | * | 1/1999 | Horan et al. | 710/306 |
| 5,859,987 A | * | 1/1999 | Gillespie et al. | 710/311 |
| 5,960,213 A | * | 9/1999 | Wilson | 710/2 |
| 5,987,555 A | * | 11/1999 | Alzien et al. | 710/312 |
| 6,094,699 A | * | 7/2000 | Surugucchi et al. | 710/314 |
| 6,119,192 A | * | 9/2000 | Kao et al. | 710/311 |
| 6,141,708 A | * | 10/2000 | Tavallaei et al. | 710/62 |
| 6,243,097 B1 | * | 6/2001 | Brokenshire et al. | 345/421 |
| 6,272,582 B1 | * | 8/2001 | Streitenberger et al. | 710/314 |
| 6,393,502 B1 | * | 5/2002 | Meyer et al. | 710/58 |
| 6,662,257 B1 | * | 12/2003 | Caruk et al. | 710/305 |
| 6,675,292 B2 | * | 1/2004 | Prabhu et al. | 712/244 |

OTHER PUBLICATIONS

PCI Local bus Specification Revision 2.1 Jun. 1, 1995 Chapter 6.*
Microsoft Press Computer Dictionary, second edition, Nov. 1, 1993, p. 251.*

* cited by examiner

*Primary Examiner* — Paul R Myers
(74) *Attorney, Agent, or Firm* — Faegre Baker Daniels LLP

(57) ABSTRACT

A configurable register method and structure included configuration logic to form a register value. A data bridge system, for connecting an interface of a computer system to a plurality of application-specific integrated circuits (ASIC), has a data bridge operatively coupled between the computer interface and the plurality of ASICs that employs the configurable registers. The data bridge has a read only memory for storing at least the initial values and mask values for each ASIC of the plurality of ASICs. The data bridge upon initialization forms base address registers and other configuration data that are queried by the computer system. When the ASICs are graphic processors, the initial values and the mask values stored in the read only memory define the base address registers in the data bridge as a function of the configuration requirements of the graphic processors. The base address registers are thus programmable as a function of the initial values and mask values in the read only memory. The read only memory is coupled to the data bridge.

24 Claims, 3 Drawing Sheets

METHOD AND APPARATUS FOR A DATA BRIDGE IN A COMPUTER SYSTEM

FIELD OF THE INVENTION

The present invention relates generally to computer architecture and more particularly to a data bridge.

BACKGROUND OF THE INVENTION

FIG. 1 illustrates a schematic block diagram of a computer system. As shown, the computer system includes a central processing unit (CPU) 1000 operably coupled to local cache 1002 and to a north bridge 1004. The central processing unit 1000 when executing a memory transaction (e.g., a read from memory command, a write to memory command, or a read/write command) internally processes addresses associated with the transaction in virtual, or linear, address space. To communicate with the north bridge, the central processing unit converts the virtual addresses into physical addresses. The north bridge, upon receiving the physical addresses, determines whether the transaction is addressing a location within a DRAM address space, or a PCI address space.

If the received physical address corresponds to the GART address space, the north bridge 1004 may further translate the physical address, using a GART table, into a corresponding physical address. Having obtained the physical address, the north bridge 1004 communicates with a memory 1006 to retrieve an appropriate memory block (e.g., line of memory, or multiple lines of memory where a line is 32 bits, 64 bits, 128 bits, etc.). If the physical address corresponds to the memory 1006, the north bridge 1004 utilizes the physical address to facilitate the memory transaction. As such, if the memory transaction was a read transaction, the north bridge 1004 facilitates the retrieval of the corresponding memory line or lines from memory 1006 and provides them to the central processing unit 1000. If the received physical address corresponds with the PCI address space, the north bridge 1004 passes the transaction to the PCI bus 1008.

The south bridge 1010, upon receiving a physical address, determines which of the plurality of I/O devices 1012, 1014, 1016 is to receive the transaction.

In addition to the north bridge 1004 receiving transactions from the central processing unit 1000, it may also receive transactions from a video graphics processor 1020 and the south bridge 1010 relaying transactions from I/O devices 1012, 1014, 1016. Such transactions have varying requirements. For example, transactions from the central processing unit 1000 and video graphics processor 1020 are typically high speed transactions which require low latency. The amount of data in such transactions may vary but is generally a memory line or plurality of memory lines per transaction. The transactions from the I/O devices 1012, 1014, 1016 are generally large amounts of data (i.e., significantly more than several memory lines of data), but are typically latency tolerant.

The video graphics processor 1020 provides display data to a display (not shown). Typically, the video graphics processor 1020 will include a frame buffer for storing at least part of a screen's worth of data. To minimize the size of the frame buffer or to extend the memory used for generating the display data, the video graphics processor 1020 often uses system memory. Sometimes these processes are inside the AGP aperture. In this instance, the video graphics processor 1020 is writing to and reading from the memory 1006 via the AGP 1022 bus and the north bridge 1004. The processing of video graphics data requires a high speed low-latency transmission path.

As is known in the prior art, upon initialization of the system, each application specific integrated circuit (ASIC), such as the graphics processor 1020, has base address registers which define the starting address of a program, table, memory structure, set of registers etc. An ASIC is a chip that is custom designed for a specific application rather than a general purpose chip, such as a microprocessor. The use of ASICs improves performance over general purpose CPUs, because ASICs are hard wired to do a specific task and do not include the overhead of fetching and interpreting stored instructions. There are many varieties of ASICs.

In order to determine the system configuration upon initialization, the computer system reads queries the system components to determine which resources are required. For example, some components have address ranges that they would like to have mapped into system's address spaces. In PCI systems, this information is communicated via base address registers (BARs). In the prior, art this has been accomplished by the use of a limited number of straps or in PC's is most commonly configured using BIOS routines and specialized hardware in each ASIC to support these routines.

It is a drawback of the prior art that each of the approaches for reading the base address registers upon initialization is limited. The AGP bus is only defined to support one AGP master device. This is a further drawback in the prior art since it is desirable to use more than one AGP master device in some systems.

Consequently, a need exists for an improved method and apparatus for interfacing ASIC's to a system and a more versatile register configuration mechanism.

DETAILED DESCRIPTION OF THE PREFERRED EMBODIMENT

Generally, the present invention is a configurable register structure and method that can be used in a data bridge or any other suitable component. In one example, a data bridge is used in a computer system connected to a plurality of graphic processors. It is to be understood that the term data bridge includes single components of a variety of types. The data bridge has a programmable read only memory (ROM) for storing at least initial values and mask values for each of the graphic processors.

Figure 1:
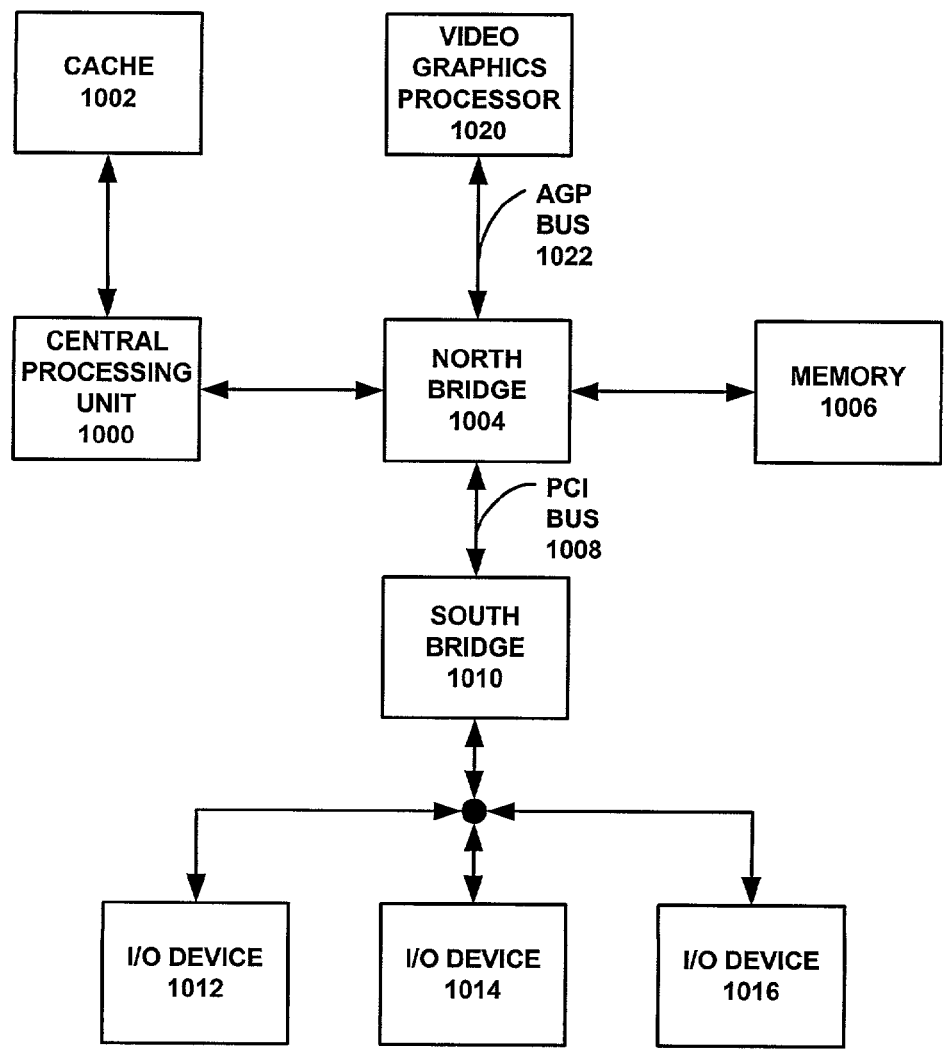
FIG. 1 depicts a schematic diagram of a prior art computing system.
Figure 2:
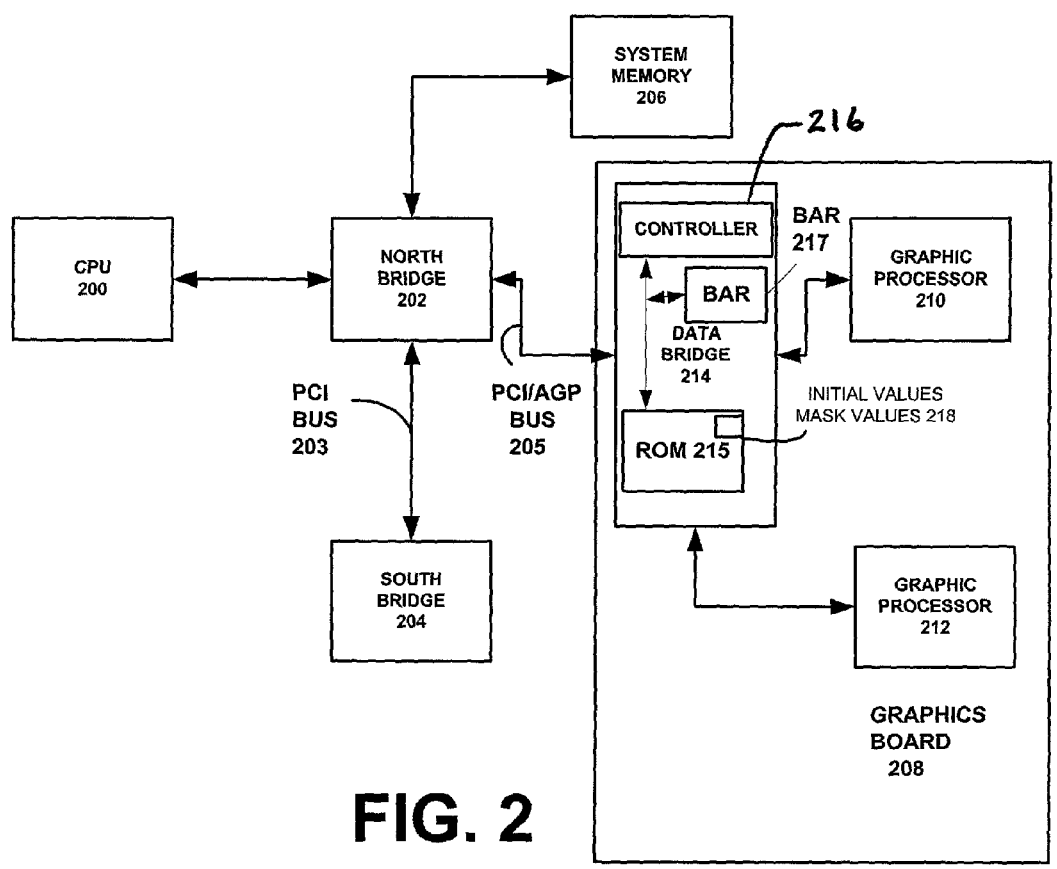
FIG. 2 is a block diagram depicting the present invention in a data bridge.

FIG. 2 depicts a portion of a computer system, which incorporates the present invention. The CPU 200 is operatively connected to a north bridge 202. The north bridge 202 is connected by PCI bus 203 to a south bridge 204. Also, a system memory 206 is connected to the north bridge 202. A PCI/AGP bus 205 connects the north bridge 202 to the data bridge 214 of the present invention. The data bridge 214 interconnects graphic processors 210 and 212 on a video board 208, such as the Rage Fury Maxx TM manufactured by ATI Technologies, Inc. This video board has dual ATI RAGE 128 PRO graphics engines. The data bridge 214 has a read only memory 215 (ROM), which is plugged into the data bridge 214 (when products use flash writeable ROMs, no sockets are necessary) and thereby can be interchanged with other ROMs.

The data bridge 214 of the present invention presents itself to the rest of the computer system in a novel manner. Upon initialization of the computer system, the north bridge 202 queries the data bridge 214 to determine how much of the system resources will be required by the data bridge 214. The north bridge 202 asks the data bridge 214 how much memory will be needed in terms of prefetchable memory, non-prefetchable memory, and I/O mapped spaced memory. The data bridge 214 (e.g., a chip) has a plurality of base address registers (BAR) 217 which hold the information regarding the graphic processors 210 and 212, on the video board 208.

When the north bridge 202 queries the data bridge 214, it writes all ones to the base address registers 217. The data bridge 214 returns corresponding bits to the north bridge 202, and the number of zero bits determines the amount of memory which is required for a particular graphics processor or, in general, an ASIC. Typically, the BARs are 32 bit registers, although other register sizes could be utilized. The computer system, after determining the amount of memory space required by each graphics processor, or ASIC, then allocates the memory and returns information regarding the location and amount of reserved memory to the data bridge and other components of the computer system.

In the prior art, information configuration data for initialization was provided by what are referred to as straps. The straps have voltage levels which set initial values for the configuration bits that are used at initialization of the system. These configuration bits tell the system the identity of components and how they are to be setup in the system. Thus, an ASIC can come up in different modes upon initialization or resetting of the computer system. For example, if two straps are used, then there are four possible configuration settings. Such settings may be, for example, memory requirements of one megabyte, 2 megabyte, 4 megabyte or 8 megabytes. It is obvious that the number of different configurations is limited by the number of straps that are provided. In modern day computer systems, this becomes a severe limitation with the variety of different ASICs that may be utilized with a computer system. The Rage Fury Maxx TM product of ATI Technologies, Inc. is just one example of the new types of ASICs that computer systems must be able to configure.

According to the present invention, the data bridge 214 includes a read only memory chip (ROM 215) that is plugged into a socket or soldered down on the data bridge 214. The ROM 215 holds and stores two values, an initial value and a writeable bit mask value 218 for each base address register 217. Each bit that is set in the mask identifies that corresponding bit in the BAR is writable. If the bit is clear, the corresponding bit in the BAR will be set to the initial value, and is read only after that, that is, it cannot be written to. For example, if a particular BAR has an initial value stored in the ROM 215 of 000000001 and a mask value of FFF00000, for example, this represents one megabyte of memory. Thus, when the north bridge 202, writes the particular BAR with FFFFFFFF, only the bits in the BAR with a corresponding bit set in the mask will be sent. The BAR will now contain FFF00001. This value read by the north bridge 202 and the configuration software utility knows to have reserved one megabyte of memory. When the mask values are changed, other different mask values representing other amounts of memory, such as 2 megabytes, 4 megabytes, 8 megabytes, are returned to the north bridge 202. It is to be appreciated that the present invention does not have the limitations of the prior art for handling large numbers of BAR configurations. At initialization of the computer system, the data bridge 214 has a controller 216 which goes out and reads the ROM 215 and forms the necessary BARs from the initial values and mask values stored in the ROM 215. Thus, the ROM 215 is only utilized at set up or upon resetting of the computer system. In other words, a required amount of memory for a particular BAR is determined by the corresponding initial value and mask value in the ROM 215. If at another point in time a user wishes to redefine that particular BAR, then the ROM 215 is flashed with a new ROM image by the data bridge 214. This new ROM 215 then has new mask values for defining the corresponding BARs 217.

For example, data bridge 214 may require 1 megabyte of memory for graphic processor 210 and 1 megabyte of memory for graphic processor 212. Thus, the ROM 215 would have the appropriate mask values so that the BARs 217 that are formed upon initialization by the data bridge 214 cause the computer system to allocate two megabytes of memory, one megabyte of memory for each of the graphic processors 210 and 212. However, the prior art was not capable of handling the situation where at a later point in time 8 meg of memory is desired for graphic processor 210 and another 8 megabytes of memory is desired for graphic processor 212, thereby requiring the data bridge 214 to request 16 megabytes of memory. Prior art systems are typically limited in the number of possible combinations allowable by the straps. The present invention allows greater flexibility in the configuration space contents. With the present invention a new ROM image is used for causing the data bridge 214 to provide the BARs 217 that will effect memory allocation of 8 megabytes of memory for each of the graphics processors 210 and 212. With prior art systems that use straps, for example, it is necessary to determine ahead of time all possible combinations that would be required. Of course, many times this information is not available. In general, many prior art systems do not even have a practical option for making changes once the initial configuration is set.

For each graphics processor, or ASIC, a first BAR is provided for defining prefetchable memory space, a second BAR is provided for defining non-prefetchable memory space, and a third BAR is provided for defining I/O mapped memory space. In a computer system, there can be up to six BARs for any PCI device or AGP graphics adapter. That is, there are up to six programmable decoders which are using the values stored in the base address registers. For example, the first BAR defines the memory decoder for the device's local memory and indicates that it is a prefetchable memory. The second BAR can define a memory mapped I/O decoder for the I/O register set and indicates that it is non-prefetchable memory. The computer system probes these registers to determine the size of the local memory and register set and then assigns base addresses to each of the regions. For example, as shown in FIG. 2, the graphics processor 212 is a graphics adapter which has AGP capabilities, and the graphics processor 210 a graphics adapter, which does not have AGP capabilities. As is known in the BARs, the first bit, for example, indicates whether the BAR is an I/O or memory BAR, and the third bit, for example, indicates whether or not the BAR is indicating prefetchable memory. The number of BARs of the six BARs that are utilized during a particular session of the computer system is determined by the data bridge 214. In the present invention, each of the BARs can be turned on and off by the computer system. The initial value and writable bit mask is also used to populate the other configuration space registers, for example, capabilities pointer, AGP status, AGP command, interrupt pin, subsystem adapter ID, etc.

In one mode, the data bridge is configured to appear as a single graphics controller when it's configurable space is read. As depicted in FIG. 2 the data bridge 214 is only seen by the system (north bridge 202), and the graphics processors or adapters 210 and 212 on the video board 208 are not seen by the computer system. For example, each PCI chip has configuration space which contains the device ID, Vendor ID, and other configuration data. Upon initialization, the computer system queries each device connected to it. In the present invention, the computer system only queries the configuration data of the data bridge 214. Thus, in an example where the data bridge 214 is requesting 2 megabytes of memory from the north bridge 202, the 2 megabytes of memory is really split into one megabyte of memory for the graphics processor 210 and another one megabyte of memory for the graphics processor 212. In this example the first three BARs in the data bridge 214 have initial values and mask values stored in the ROM 215. If the last three BARs are not used in a particular configuration, then all zeros are stored for each of the initial values and mask values for the these last three BARs. For a particular BAR, if the north bridge 202 gets all zeros back then it does not allocate any memory for that BAR. The present invention thus provides via the ROM 215 programmable base address registers. It is to be understood that the data bridge 214 in one mode can mask the existence of the graphic processors 210 and 212 from the north bridge 202.

In another mode, the data bridge 214 allows the graphic processors 210 and 212 to "pass through" so that they are seen by the north bridge 202. Because the data bridge 214 operates in different modes, there are times when the BARs have to be "on" and other times when the BARs have to be "off". Furthermore, at different times the BARs 217 in the data bridge 214 may have to have different values. Indeed, the entire configuration space has different mapping, depending on the type definition. One mode configures the configuration space registers to define a single graphics adapter. Another mode defined a PCI to PCI bridge. There are also a few modes that define multi function devices where some of the functions are graphics adapters and one of the functions is a PCI to PCI bridge.

Figure 3:
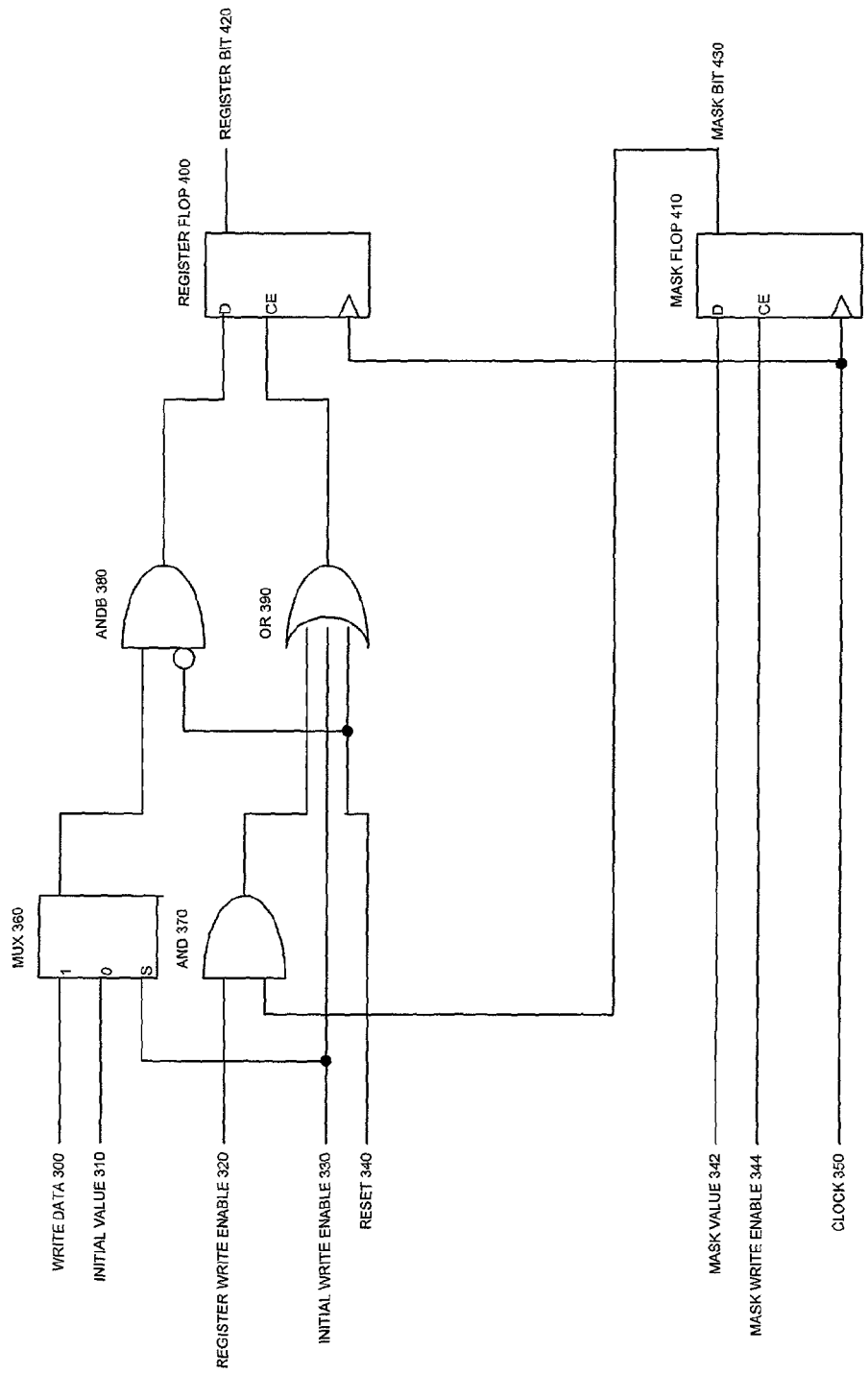
FIG. 3 is a diagram illustrating one example of a configurable register in accordance with one embodiment of the invention.

FIG. 3 shows one example of a circuit for providing a configurable register using a single bit of a single register, such as a base address register, a command register, configuration register or any other suitable register (i.e., memory element). The circuit includes a mux 360, AND gate 370, NAND gate 380, OR gate 390, Register flop 400 and Mask flop 410. The register bit is completely flexible, in that the register bit can be configured as either a read only bit, or read/writeable bit, and can be loaded with any initial value. If the bit is read only, then this initial value will be the value that is always read from the bit. So the function of the bit (read/RW) and read only value are totally programmable, even though fixed hardware is used to form these registers. The data for the initial values and mask values is stored in something that is modifiable, for example, the ROM 215.

The initial values and mask values are for use in forming a register. The circuit is a configurable register that includes register configuration logic (e.g., mux 360, AND gate 370, NAND gate 380 and OR gate 390). The register flop 400 contains an initial value that is represented by the register bit 420. The mask flop 410 generates a mask bit for the configuration logic. The register configuration logic configures the register flop 400 to be read and or writable based on the mask value 342 stored in the memory.

Reset 340 is used to put the register bit into a defined state. The Mask register flop 410 is not reset, because, as long as the Mask register bit 430 is written to before the Register flop 400 is written by the system write path 320, the initial undefined state of the Mask register flop 410 will not propagate to the Register flop 400. Certainly the Mask register flop could be reset as well.

At some time before the register value is read, the initial and mask values are written. The order is immaterial. The Mask register holds the mask value. When the Mask bit 430 is set to '1', the register bit will be writeable via the system write path 320, when it is '0', the register bit is not writeable, and the register bit is read only.

The initial value and mask values 218 are stored in the ROM 215. These are brought in from the ROM 215 via the ROM controller 216 which generates the protocol to read data from the ROM 215. The ROM can be read, and the values stored in some intermediate location, if that is needed. The initial and mask values 218 can also be read from the ROM 215 at the time that these are written to the Mask 410 and Register 400 flops. More precisely, the mask value is read from the ROM 215 via the ROM controller 216 and is written to the Mask register flop 410 via the Mask Write Enable signal 344. The initial value is also read from the ROM 215 and the value for this bit is written into the Register flop 400 via the Initial Value signal 310 using the Initial Write Enable signal 330.

The "normal" register write path, typically from the CPU 200, writes the Register flop 400 via the Write Data 300 and the Register Write Enable 320 signals. Once a bit has a '0' written into the Mask register flop 410, all attempts to write the register bit via the "normal" register write path are blocked, and the contents of the register bit remain unchanged, effectively creating a read only register bit. In FIG. 3, this is accomplished by the AND gate 370 which blocks the Register Write Enable signal 320 when the Mask bit 430 is '0'.

As shown, the multiplexing circuit is operatively responsive to the initial value and write data. The AND gate is operatively responsive to a register write enable signal and to the mask bit. The OR gate is operatively coupled to receive an output from the AND gate and operatively responsive to an initial write enable signal and a reset signal, and the NAND gate is operatively coupled to the multiplexing circuit and operatively responsive to the reset signal and has an output operatively coupled to the register flop.

The mask flop is operatively responsive to the mask value and a mask write enable signal. When the circuit is applied to a initialization system, the circuit may be operatively coupled to a computer system such that upon initialization of the computer system, the computer system allocates system resources to each of a plurality of ASICs based on the initial values.

It will be understood that variations in circuit implementation that accomplish the same function are covered by this patent. For example, using different gates, or flops that do not use clock enables, or storage that is done with latches, or memory elements, can all be done to accomplish the same function as the circuitry of FIG. 3.

The present invention overcomes the deficiencies in the prior art by providing a method and apparatus that provides programmable base address registers which are constructed from information stored in a read only memory that is coupled to the data bridge in the present invention. Therefore, the configuration limitations of the prior art are overcome by the data bridge of the present invention. The present invention is not limited to the particular details of the apparatus and method depicted, and other modifications and applications are contemplated. Certain other changes may be made in the above-described method and apparatus without departing from the true spirit and scope of the invention herein involved. For example, the present invention can be utilized in a wide variety of different computer systems, and can be used with a wide variety of ASICs, and is not limited only to being used with graphic adapters. It is intended, therefore, that the subject matter of the present application shall be interpreted as illustrative and not in a limiting sense.

What is claimed is:

1. A data bridge system, comprising:
    an interface for transferring data;
    a plurality of application-specific integrated circuits (ASICs);
    a data bridge operatively coupled to each: of the interface and the plurality of ASICs;
    the data bridge having a read only memory for storing at least initial values and mask values for each ASIC of the plurality of ASICs; and
    at least one configurable register that includes register configuration logic and at least one register flop to contain an initial value and at least one mask flop that generates a mask bit for the configuration logic and wherein the register configuration logic configures the at least one register flop to be read and/or writable based on at least one mask value stored in the memory.

2. The data bridge system according to claim 1, wherein at least one of the plurality of ASICs is a graphic processor.

3. The data bridge system according to claim 1, wherein the interface is connected to a north bridge in a computer system.

4. The data bridge system according to claim 1, wherein the data bridge upon initialization forms at least one of: base address registers that are queried by the interface, command registers, and configuration registers.

5. The data bridge system according to claim 4, wherein the data bridge has six base address registers, each of the base address registers in the data bridge having a corresponding initial value and mask value that is stored in the read only memory.

6. The data bridge system according to claim 5, wherein the ASICs are graphic adapters, and wherein the initial values and the mask values stored in the read only memory define the base address registers in the data bridge as a function of the configuration requirements of the graphic adapters.

7. The data bridge system according to claim 1, wherein the data bridge forms base address registers as a function of the initial values and mask values stored in the read only memory, and wherein a first base address register defines prefetchable memory space, a second base register address defines non-prefetchable memory space, and a third base address register defines I/O mapped space.

8. The data bridge system according to claim 1, wherein the data bridge has a plurality of base address registers that are programmable as a function of the initial values and mask values in the read only memory.

9. The data bridge system according to claim 1, wherein the read only memory is at least one of removably coupled to the data bridge and writable.

10. A method for configuring a plurality of ASICs in a multi-ASIC system comprising:
    reading, initial values and mask values from a read only memory; and
    forming, from the initial values and the mask values, configurable registers, that upon initialization of a system cause the system to allocate resources to each of the plurality of ASICs.

11. The method according to claim 10,
    wherein the computer system has an interface that, upon initialization of the computer system, writes all ones to base address registers of a data bridge and then reads back values to determine a size of a resource; and
    wherein the computer system allocates memory space in the computer system as a function of the information in the base address registers.

12. The method according to claim 10, wherein the interface is connected to a north bridge in a computer system.

13. The method according to claim 10, wherein the data bridge has six base address registers, each of the base address registers in the data bridge having a corresponding initial value and mask value that is stored in the read only memory.

14. The method according to claim 13, wherein the ASICs are graphic adapters, and wherein the initial values and the mask values stored in the read only memory define the configuration registers in the data bridge as a function of the configuration requirements of the graphic processors.

15. The method according to claim 14, wherein the data bridge forms configuration registers as a function of the initial values and mask values stored in the read only memory, and wherein a first base address register defines prefetchable memory space, a second base register address defines non-prefetchable memory space, and a third base address register defines I/O mapped space.

16. The method according to claim 10, wherein the data bridge has a plurality of base address registers that are programmable as a function of the initial values and mask values in the read only memory.

17. The method according to claim 10, wherein the read only memory is at least one of removably coupled to the data bridge and is writable.

18. The method according to claim 10, wherein at least one of the plurality of ASICs is a graphic adapter.

19. The method according to claim 10 wherein at least a plurality of the ASICs are graphic processors, and wherein the initial values and mask values stored in the read only memory define the configuration registers in the data bridge as a function of the configuration requirements of the plurality of graphic processors.

20. A circuit comprising:
    memory containing initial values and mask values for use in forming a register; and
    at least one configurable register that includes register configuration logic and at least one register flop to contain an initial value and at least one mask flop that generates a mask bit for the configuration logic and wherein the register configuration logic configures the at least one register flop to be read and/or writable based on at least one mask value stored in the memory.

21. A circuit comprising:
    memory containing initial values and mask values for use in forming a register;
    at least one configurable register that includes register configuration logic and at least one register flop to contain an initial value and at least one mask flop that generates a mask bit for the configuration logic and wherein the register configuration logic configures the at least one register flop to be read and/or writable based on at least one mask value stored in the memory;
    wherein the configuration logic includes:
        a multiplexing circuit operatively responsive to the initial value and write data,
        an AND gate operatively responsive to a register write enable signal and to the mask bit,
        an OR gate operatively coupled to receive an output from the AND gate and operatively responsive to an initial write enable signal and a reset signal, and a NAND gate operatively coupled to the multiplexing circuit and operatively responsive to the reset signal and having an output operatively coupled to the register flop.

22. The circuit of claim 21 wherein the mask flop is operatively responsive to the mask value and a mask write enable signal.

23. The circuit of claim 22 operatively coupled to a computer system such that upon initialization of the computer system, the computer system allocates system resources to each of a plurality of ASICs based on the initial values.

24. A method for configuring a plurality of ASICs in a multi-ASIC system comprising:

reading, initial values and mask values from a read only memory;

forming, from the initial values and the mask values, configurable registers, that upon initialization of a system cause the system to allocate resources to each of the plurality of ASICs; and wherein forming the configurable registers comprises forming at least one register flop of the configurable register to be read and/or writable based on at least one mask value.

* * * * *